United States Patent [19]

Bertrand et al.

[11] 3,939,321

[45] Feb. 17, 1976

[54] PORTABLE ELECTRICAL DISCHARGE METALWORKING MACHINE

[75] Inventors: Isidore L. Q. Bertrand; Wilford R. Hays, both of Los Angeles, Calif.

[73] Assignee: Lockheed Aircraft Corporation, Burbank, Calif.

[22] Filed: Nov. 19, 1973

[21] Appl. No.: 417,391

[52] U.S. Cl............ 219/69 D; 219/69 E; 219/69 V
[51] Int. Cl.² ........................................... B23P 1/08
[58] Field of Search ... 219/69 D, 69 E, 69 M, 69 V, 219/75, 98, 127, 76, 77, 69 R; 91/234

[56] References Cited
UNITED STATES PATENTS

| | | | |
|---|---|---|---|
| 2,385,665 | 9/1945 | Warwick | 219/69 V |
| 2,512,706 | 6/1950 | Anderson | 219/69 E |
| 2,753,429 | 7/1956 | McKechnie | 219/69 V |
| 2,817,003 | 12/1957 | Dusek | 219/127 X |
| 2,861,548 | 11/1958 | Burgess et al. | 91/234 X |
| 2,903,556 | 9/1959 | McKechnie | 219/69 V |
| 3,334,210 | 8/1967 | Williams et al. | 219/69 D |
| 3,701,879 | 10/1972 | Gstohl et al. | 219/69 M |
| 3,758,744 | 9/1973 | Spisak | 219/98 |
| 3,763,343 | 10/1973 | Rocklin | 219/76 |

*Primary Examiner*—Bruce A. Reynolds
*Attorney, Agent, or Firm*—Billy G. Corber; William Kovensky; Lowell G. Turner

[57] ABSTRACT

A compact, portable electrical discharge metalworking machine for off-hand use and general applicability. The invention is a lightweight, versatile gun type tool which has air and water cooling of electrode and work, a vibrating electrode to facilitate its motion inside the work, a simple, automatic, spring driven, all orientation electrode feed, and uses low voltage, high amperage electricity.

22 Claims, 9 Drawing Figures

PORTABLE ELECTRICAL DISCHARGE METALWORKING MACHINE

This invention relates to metalworking, more particularly to an improved method and apparatus for making holes in metal utilizing electrical energy.

The art of making holes in metal using means other than conventional drills is a fairly recent development, but it has been intensively developed. Such non-conventional means were developed to fabricate modern materials such as Inconel, titanium and the like, which are extremely difficult to machine. This difficulty increases many fold when a conventional tool such as a drill or a reamer breaks and sticks in the work. Thus, an important use of all such non-conventional metalworking processes, including the electrical discharge type which includes the invention, is to remove such broken tools. However, most such techniques pertain to specialized situations and do not have the versatility of the invention.

Such techniques fall into several general types or classes. One is chemical milling, which uses photographic processes to mask the work, and strong acids and the like to eat away metal. Chemical milling is highly successful in certain special applications, however, it is not competitive with the invention in that it is not hand held, is slow and expensive, and it requires a great deal of large, expensive, stationary equipment. These techniques are essentially de-plating operations and are thus subject to all of the limitations of that art, including slow erosion rates, and great stability for successful operation.

In electrical milling or electrical discharge metalworking electricity itself acts to melt or otherwise remove the metal of the workpiece in a controlled manner. However, the art to date suffers from many problems which are overcome by the invention. Many such electrical discharge machines are not portable and require connections to plumbing and/or sources of extremely high powered electricity. Obviously, such stationary machines lack the versatility of the hand held machine of the invention.

Another disadvantage is that many such prior machines operate at a relatively high voltage, which is dangerous to personnel. That is, the same amount of power which can kill a person at a high voltage and low amperage, would not be felt by a person at a low voltage and a high amperage. The invention utilizes such high amperage low voltage electricity.

The entire field of electrical discharge metalworking requires that the work be cooled. Another concurrent desideratum is, in some but not all electrical discharge machines, that the work be kept clear of "chips" as the hole is produced. That is, sometimes, depending on a number of factors, the melted metal (corresponding to chips in conventional drilling) must be removed during operation. In some prior machines one or both of these problems is solved by means of a relatively heavy flow of water or other fluid which serves to cool and to flush. When water or other liquid is used alone, relatively large amounts are needed to do one or both jobs adequately. The problem with liquid only is that such relatively large amounts make a mess around the work site, and the supplying of the liquid often means stationary plumbing or relatively large tanks, and the like. The use of the air or other gas by itself to do one or both of these jobs avoids the problem of a mess around the work site, but suffers from the disadvantage that it is sometimes difficult to obtain a large enough flow of air to adequately cool and/or flush, especially in relatively deep holes. Further, equipment, itself heavy and tending to be stationary, to compress the gas and flow it to the work may also be needed. The invention solves this problem in a portable and hand held machine by providing a combination of air and water to cool and to flush. The air is supplied via industrial 90–100 psi service air which is universally available. The water is supplied via a small bottle built into the console portion of the invention, and this bottle includes a tap into the air supply to pressurize and to drive the water. The invention also includes means to adjust the ratio of air and water supplied to the work so that the amount of water for cooling just equals that amount of water which the heat produced will vaporize, thus avoiding the liquid mess which was heretofore a problem.

Another problem in prior electrical discharge metalworking machines is that care had to be taken to maintain a gap of predetermined dimensions between the electrode and the work. This need resulted in rigidity which often required holding tools for the work and the electrode, and complex machinery for moving the work and/or the electrode. If the electrode got too close to the work they could weld together. If the electrode was too far from the work then the metal removal action became very inefficient or stopped entirely. The combination of the invention includes simple spring driven means to advance the electrode in the hand held gun with respect to the work, as well as a simple pneumatic vibrator to keep the electrode moving rapidly. These two parts of the gun in concert maintain a working gap between electrode and work while at the same time preventing welding of the electrode to the work. A manual override is also provided to initially position the electrode and to act as a safety in the event a weld should somehow occur. The vibrator is in the service air line in the gun, thus further enhancing the invention's advantages of simple construction, light weight, and high reliability in use.

The invention was developed in the environment of aircraft manufacturing, and in this field it is often impossible to bring the work to the tool. That is, if a conventional drill or reamer, or hard parts such as heat treated steel or titanium bolts or fasteners, or the like, should break or stick in a partially assembled airplane, they were heretofore virtually impossible to remove, and it was often necessary to disassemble the airplane sufficiently to carry away the part containing the object to be removed. In other situations in the aircraft industry electro discharge machines could not be used because the liquid coolant mess was more of a problem around aircraft than was the broken drill, and because a true portable machine is not available. Thus, the features of portability and being hand held to permit off-hand use by the operator allows the modern technique of electrical discharge metalworking to be brought to heretofore impossible problems and applications.

The gun portion of the invention includes a front end rest which may be pressed against the work for off-hand use, or which may be clamped or bolted to the work when the problem demands and permits greater stability between the gun and the work.

Use as a trouble shooter is only one of the uses for the invention, it may also be used as a production tool on "exotic" materials used in the aerospace and other industries, and the like.

The invention is a combination lightweight hand held gun having all the features of automatic advancing of the electrode into the work, vibrator reciprocation of the electrode, means to supply both air and water to cool and to flush the work, and all of this, including the gun, the console, and all of the auxiliary parts being so configured that they may be packed into a single case which the operator can carry with him from place-to-place.

The above and other advantages of the invention will be pointed out or will become evident in the following detailed description and claims, and in the accompanying drawing also forming a part of the disclosure in which.

Figure 1:
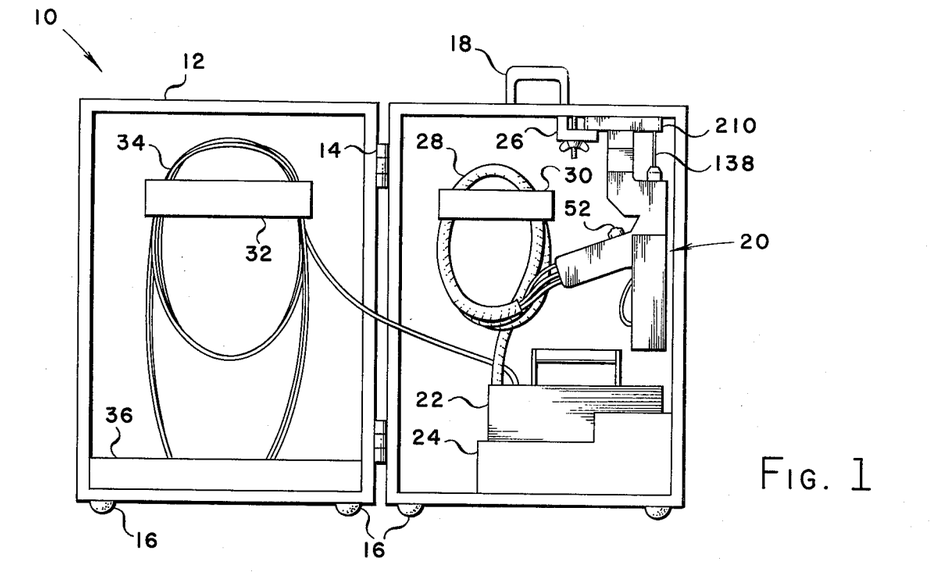
FIG. 1 is a front elevational view of the invention machine mounted in its carrying case.

Referring now in detail to the drawing, FIG. 1 shows a successfully constructed embodiment 10 of the invention mounted in a portable carrying case or box 12. Box 12 is hinged at 14, has feet 16 at its lower end, a handle 18 at its upper end, and a latch or other securing means, not shown. In the successfully constructed embodiment the box was made of ⅜ inch plywood, had outside dimensions of approximately 18 × 20 × 9 inches, and a weight of about 40 lbs. including the invention machine mounted therein.

The machine comprises a gun 20, a console 22, and a composite cable 28 interconnecting the gun and the console coiled on a suitable spool 30 on the inside of the box 12. A sheet metal shelf 24 seats the console 22 and a wing nut secured clamp 26 holds the gun in the box. A spool 32 is mounted on the other half of the box to carry wire 34 and other lines. A shelf 36 is provided to secure the lines, as a storage place for an extension cord, spare electrodes, a supply of soluble oil, and as a general catchall.

Figure 2:
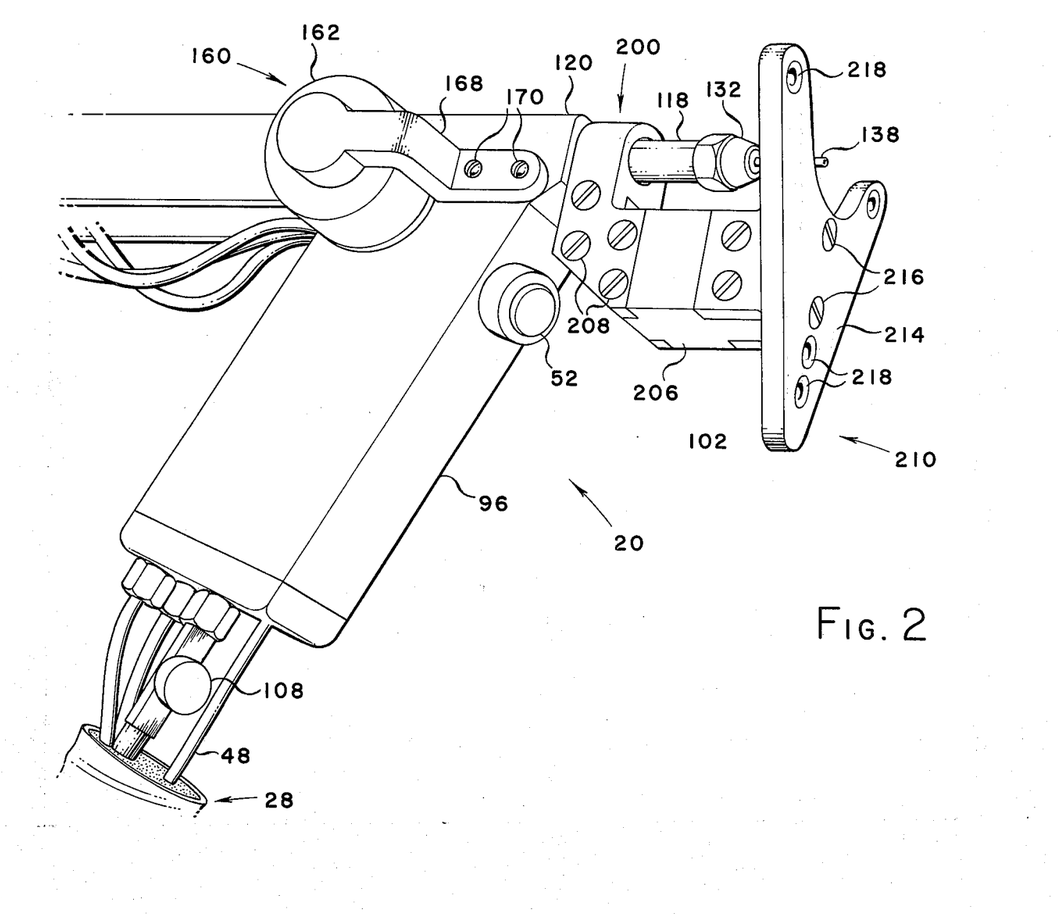
FIG. 2 is a perspective view of the gun portion of the invention.
Figures 3, 8:
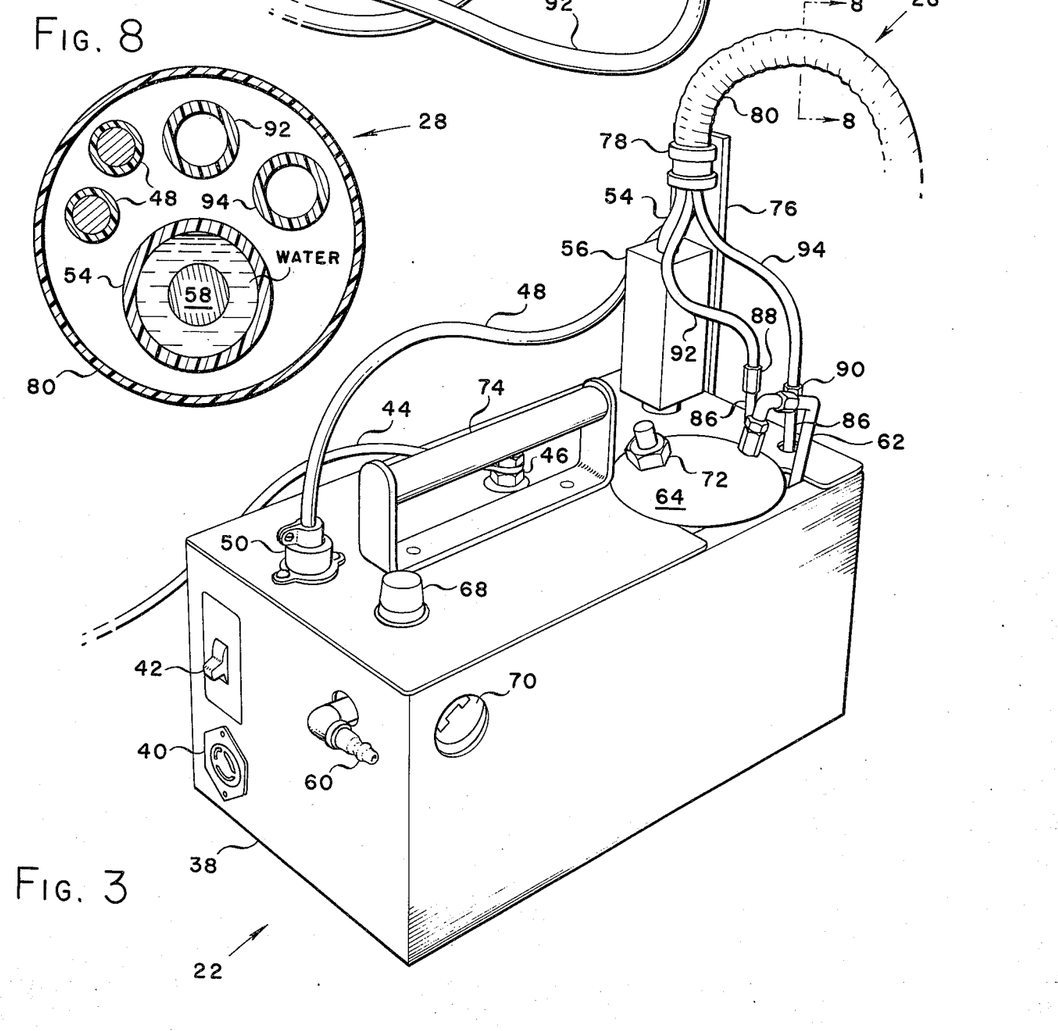
FIG. 3 is a perspective view of the console portion of the invention.
FIG. 8 is a cross-sectional view of the composite cable taken on line 8—8 of FIG. 3.

FIG. 2 shows the gun in perspective, and FIG. 3 is a similar view of the console and the composite cable. For ease of understanding, reference should be had to these drawings as this detailed description proceeds, as well as to the combined schematic of FIG. 9.

Referring now to FIG. 3, the console is housed in a metal box 38 or other suitable closure. In the successfully constructed prototype embodiment, the console measured approximately 15 inches long by 7 inches high by 7 inches deep. A receptacle 40 is provided for the power cable 34, see FIG. 9, after which is a master on/off switch 42. A ground cable 44 is connected in the conventional manner to a stud 46 to provide an electrical connection to the work in order to complete the main power circuit. That is, the other end of cable 44 (not shown) is attached in any conventional manner to the work, and the circuit from the work through the electrode in the gun, back to the console, as described below, is thereby completed. An electrical trigger cable 48 is connected to box 38 by a suitable conventional connector 50, and extends through composite cable 28 to the main on/off push button switch 52 in the gun 20, see FIG. 2. A liquid conduit 54 made of a plastic or other non-electrical conducting material passes from inside the box 38 through a central opening in a supporting member 56, and this conduit 54 contains both water and a cable 58, see FIG. 9, for the electrical energy from the console to the gun. Since the invention operates at relatively high amperage, the main power cable 58 inside conduit 54 carrying that current to the gun will get quite hot, and thus providing a sheath of water around the cable in the conduit serves as a coolant for cable 58.

Console 22 has air handling means which includes a quick disconnect nipple 60 on the outside of box 38 to which the conventional service air line is connected. A line 62 (see FIG. 9) inside the box 38 leads to a "T" and thence branches to a water reservoir bottle 64 and to a pressure regulator 66. This regulator is a staple item of commerce and includes a manual pressure adjusting knob 68 and a dial or other indicating means 70, see FIG. 3. The water reservoir bottle 64 has a filler 72 shown in FIG. 3.

The console 22 includes a handle 74 at the top, and a standard 76 on support 56 which carries a clamp 78 at its upper end for holding the hose 80 which is of corrugated construction, and is the outside protective sheath of composite cable 28.

After regulator 66, the throttled air passes through a solenoid operated valve 82 and thence to a line 84 and a "T" 86 terminating at a pair of connectors 88 and 90. Thereafter, a pair of flexible air lines 92 and 94 extend from these connectors to and through composite cable 28, and thence to the gun 20.

The gun 20, see FIGS. 2 and 4 to 7, comprises a handle portion 96; and a top comprising a tandem arrangement of a work contacting rest assembly 102; a center, quill and feeding portion 98; a mixing manifold portion 104, and a vibrator 100.

The composite cable 28 ends at the bottom of the handle 96, and the lines pass therethrough to the other portions of the gun. The gun end of hose 80 is potted around the lines with a suitable rubber compound. The handle is preferably made of a non-conducting rugged material, a phenolic impregnated cloth known as Micarta was used in the successfully constructed embodiment. The air line 92 serves the vibrator 100, and the air line 94 terminates at mixing manifold 104 which is interposed between and interconnects the vibrator 100, and the quill 98. The water in the annulus between conduit 54 and cable 58 is directed via passageways in the handle 96, not shown, and a hose 106 to the opposite side of mixing manifold 104. A manual valve 108 to control the flow of water through hose 106 is provided at the juncture of conduit 54 and handle 96. This valve is convenient to the operator for quick and easy in use control of the flow of water to the work. The water and electrical power are separated inside the handle by suitable internal passageways and an electrical conductor (both not shown) which connects conductor 58 to jumper 152 described below.

Figures 4, 5, 6:
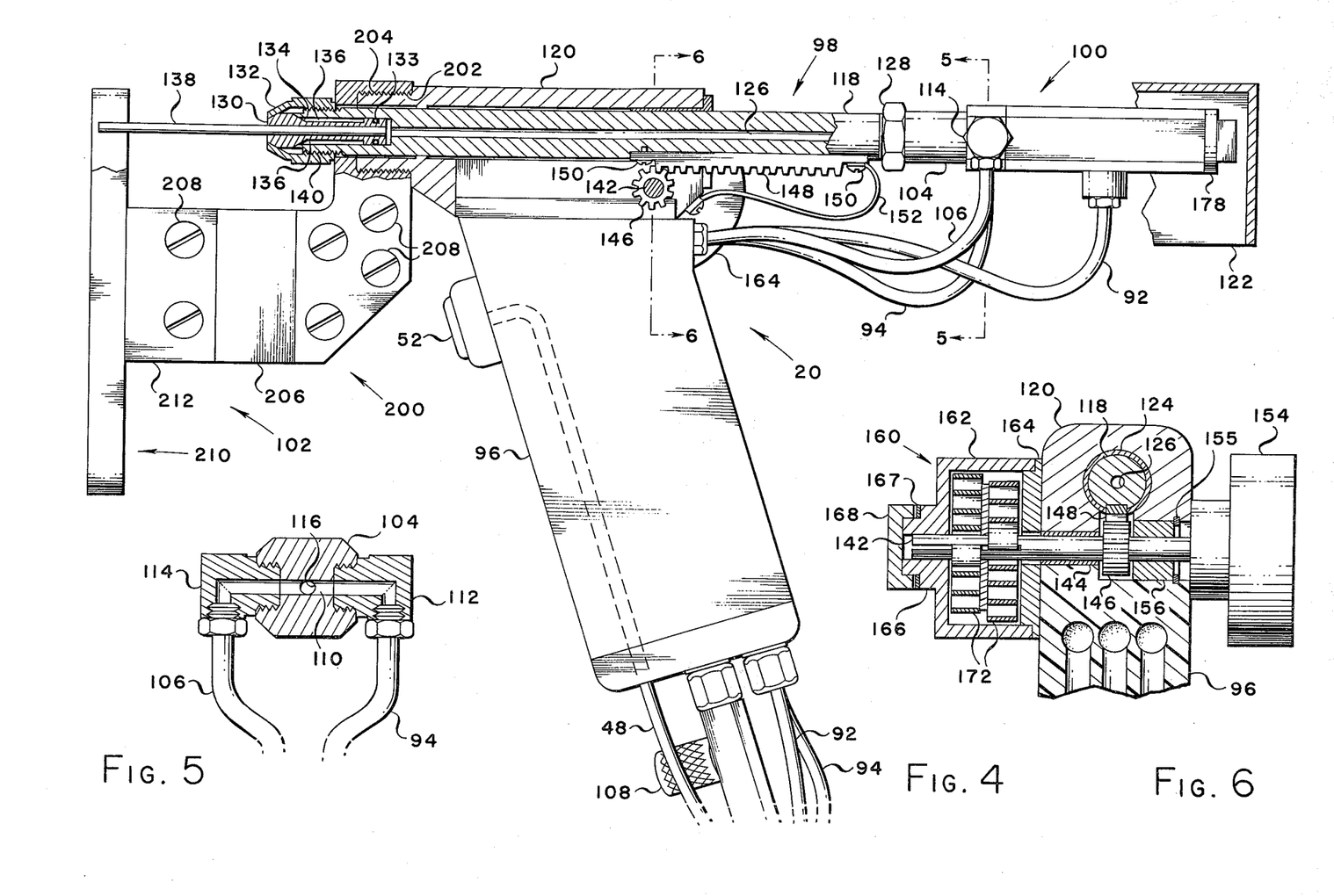
FIG. 4 is a side elevational view of the gun with some parts broken away and in cross-section.
FIGS. 5 and 6 are cross-sectional views taken on lines 5—5 and 6—6 of FIG. 4, respectively.
Figure 7:
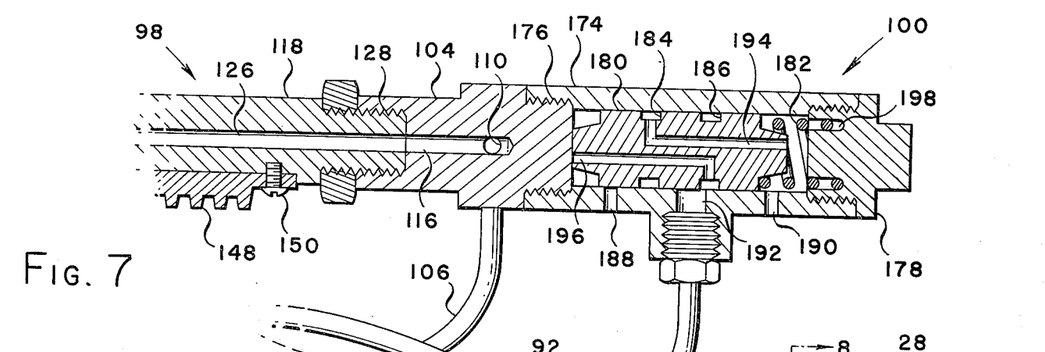
FIG. 7 is an enlarged cross-sectional view of the right hand side of FIG. 4 showing the vibrator.

Referring now to FIG. 5, means are provided to make a mixed coolant of the air and water delivered to the gun. To this end, line 94 and hose 106 communicate with the opposite ends of a transverse passage 110 in the body of mixing manifold 104 by means of a pair of suitable standard fittings 112 and 114. The air and water mix in the passage 110 and then pass via a communicating passage 116 to quill portion 98.

The center portion 98 is built around a movable quill member 118 and a fixed housing 120. The housing is secured by screws (not shown) to the top of the handle 96. The top of the housing 120 is preferably removably secured to the lower part, as by screws (not shown), to thereby facilitate removal of the quill from the tool should such action be necessary for repair or maintenance. A protective shield 122, shown only partially at the right side of FIG. 4 for the sake of clarity, may be provided and may be secured to the housing 120 and/or handle 96 in any suitable manner. This shield may extend over the entire top of the gun to leave only the electrode exposed.

The quill 118 is reciprocably mounted in the housing 120 and a smooth movement of the quill therein is assured by means of an elongated guide bushing 124, which may be made of sintered impregnated brass or the like. In regard to materials, the drawing shows a plastic handle and a metal housing, but other combinations and types of materials may be used. For example, all the parts could be metal. Because of the low voltage used, an all metal gun is safe to use, and it also eliminates the need for the internal connecting wire and the jumper cable 152 from housing to quill described below.

The quill 118 is formed with an axial through opening 126 which communicates with the passage 116 in the manifold 104 via the mating stud and receptacle connection 128. The front end of this passageway 126 is enlarged to receive a specially made electrode collet 130. The enlarged collet head has a front conical surface which cooperates with a mating surface on a collet securing spindle 132 which urges the collet rearwardly and seats it in the quill by means of a rear conical surface 134 which mates with a mating surface at the extreme front end of the quill 118. An O-ring 133 at the rear end provides a seal between collet and quill. The shank of the collet is formed with a plurality of slots 136 to assure that the collet will not bind in its seat in the front end of the quill, and to permit the collet to grip and clamp on the electrode. The hollow electrode 138 snugly fits in opening 126, and is secured therein by the parts 130 and 132. That is, as the spindle 132 is moved rearwardly on its threaded connection 140 on the quill, it urges the collet into tightly gripping relationship with the electrode. The electrode is formed of a rugged material such as tungsten carbide or molybdenum. Since it is slowly consumed during operation of the invention, the parts 130, 132 and 140 permit the feeding up of additional electrode as it is consumed. The successful prototype of the invention used an electrode made of molybdenum, but it is thought that other materials such as copper or tantalum could also be used. It is thought that such an electrode about 8 inches long about 0.093 inch O.D. and about 0.020 inch wall thickness at this level of electrical energy would have a useful life of about 8 to 10 inches of hole.

The prototype machine and the invention generally has the additional advantage of producing chips which were in the form of tiny spheres of the work metal. The molten metal is cooled enough to solidify. This manner of metal removal has the advantages of eliminating hazards to the operator and producing a clean wall in the hole.

Means are provided to automatically feed the electrode and the quill forwardly into the work to follow hole production. Further, these means provide for this automatic feeding in all orientations of the gun; i.e., vertically, upwardly, or downwardly, or at any angle. A manual override is also provided to permit manual feeding, breaking of a weld should it form between the electrode and the work, and retraction of the electrode out of the hole.

Referring to FIG. 6, these means comprise a cross-shaft 142 mounted in the housing 120 by means of a suitable bushing 144. Shaft 142 carries a fixed pinion 146 which cooperates with a rack 148 mounted on the underside of the quill 118 by a pair of screws 150. A flexible line 152, which is the continuation of main power cable 58, is connected to the rear screw 150. These screws 150 also serve the function of limiting the travel of the rack 148 on its pinion 146 in that their heads will hit the teeth of the pinion at the ends of rack travel thus preventing disengagement of the rack. The primary function of screws 150, of course, is to mount the rack on the quill. Of course, means other than a rack and pinion, such as a wire and drum arrangement, could be used to permit motion of the quill and electrode.

Further in regard to the electrical energy, current is to be maximized in that current melts the work to produce the hole. The upper limit on current is determined by the need to keep the parts and especially the electrode cool, the tendency of other parts to melt, and the like. The opposing considerations as to voltage are that it is to be small enough to assure that there will be no danger to the operator, and yet at the same time large enough to establish a current flow across the gap and into the work against the resistance of any oxide coatings, dirt, grease, and the like which may be on the work. That is, there is a minimum threshold value which the voltage must exceed for proper operation. Experience with the successful prototype of the invention indicates that this threshold is in the range of 6 to 12 volts with amperage in the range of about 50 to 100 amps. The gap between electrode and work is to be kept at a minimum which enhances the accuracy of the hole.

Returning to FIG. 6, one outer free end of shaft 142 carries a fixed knob or handle 154 which permits manual operation and override of the automatic spring drive 160. Shaft 142 is mounted in a spacer bearing 156, and the entire assembly is held in housing 120 by a snap ring 155.

The spring drive 160 comprises an outer housing 162 rotatably mounted on a plate 164 secured to one side of housing 120 and handle 96. The other free end of shaft 142 extends through a suitably formed opening in plate 164 and is rotatably mounted in an outer boss portion 166 of housing 162. An outrigger support 168 (shown best in FIG. 2) snugly and rotatably receives an outside shoulder on boss 166 to thereby support the entire automatic spring drive 160 including the associated free end of shaft 142. A flat or Belleville type spring 167 is interposed between outrigger 168 and the housing boss 166. The outrigger is removably secured to the housing 120 by any suitable means such as screws 170. Shaft 142 is bifurcated to anchor the inside ends of a pair of identical but oppositely wound flat coil springs 172 which are similar to ordinary clock springs. The springs are mounted side-by-side on shaft 142, and their outer ends are fixed to the inside of the housing 162 by any suitable means such as slots formed in the rim of the housing.

In operation, the handle 154 can be used to manually extend or retract the entire quill assembly and locate the working end of the electrode 138 at the desired starting position. It should be noted that operation of handle 154 and movement of shaft 142 has no effect on vibrating means 100.

The spring drive can be operated in various ways. Firstly, with the tip of the electrode against the work, the operator can turn housing 162 to thereby produce a differential spring force tending to drive the electrode forwardly into the work. Turning the housing winds one spring while the companion spring is unwound. The operator may or may not wish to control the releasing of this spring force to drive the quill and electrode forward via rack 148 and pinion 146 by holding back on the handle 154. If housing 162 has been used to produce a relatively large spring differential force, then the operator probably will want to control its release by the use of the handle. Alternatively, if only a slight spring force is desired, then he will probably not hold back on the handle.

Another method is to first set the neutral position of the entire quill assembly including the electrode by the use of the spring housing 162 to thereby extend the working end of the electrode some predetermined distance beyond the rest 210. Handle 154 will follow the movement of housing 162. The operator then merely pushes against the work until the electrode 126 is backed up to the rest 210, which automatically puts a differential spring force on the two springs 172. Release of this spring force can then be controlled or not controlled as set forth above. This automatic advance in any case is dependent primarily on the strength and winding of the springs 172 and is substantially independent of gravity, thereby assuring proper operation in any orientation.

When it is desired to work downwardly, the housing 162 may be turned in the opposite direction whereby the differential spring force almost counterbalances the weight of the quill and attached parts to again achieve automatic feeding with the aid of gravity. The rate of speed of the automatic feed is determined by the differential spring force, and this in turn is controlled by the operator by way of the number of turns he imparts to the housing 162. The handle 154 may again come into play at the completion of a hole to withdraw the quill and electrode.

As shown, release of the spring force is controlled by the friction forces created by spring 167 and the fit between housing 162 and plate 164. As an alternative feature, and one which was used during the development of the present invention, brake means can be provided to cooperate with the cross shaft 142 to control the release of the predetermined differential spring force. Such a brake can be set so that it would normally hold against the spring force, but would automatically progressively release when subjected to the superimposed vibratory force. Such a brake can be mounted on any fixed part of the gun; for example, on the upper portion of the housing 120.

Thus, in summary, the spring drive provides means whereby a vibratory motion can be superimposed on the linear advancing motion while permitting a controlled release of the linear motion as the electrode and/or the work is eroded away.

Figure 9:
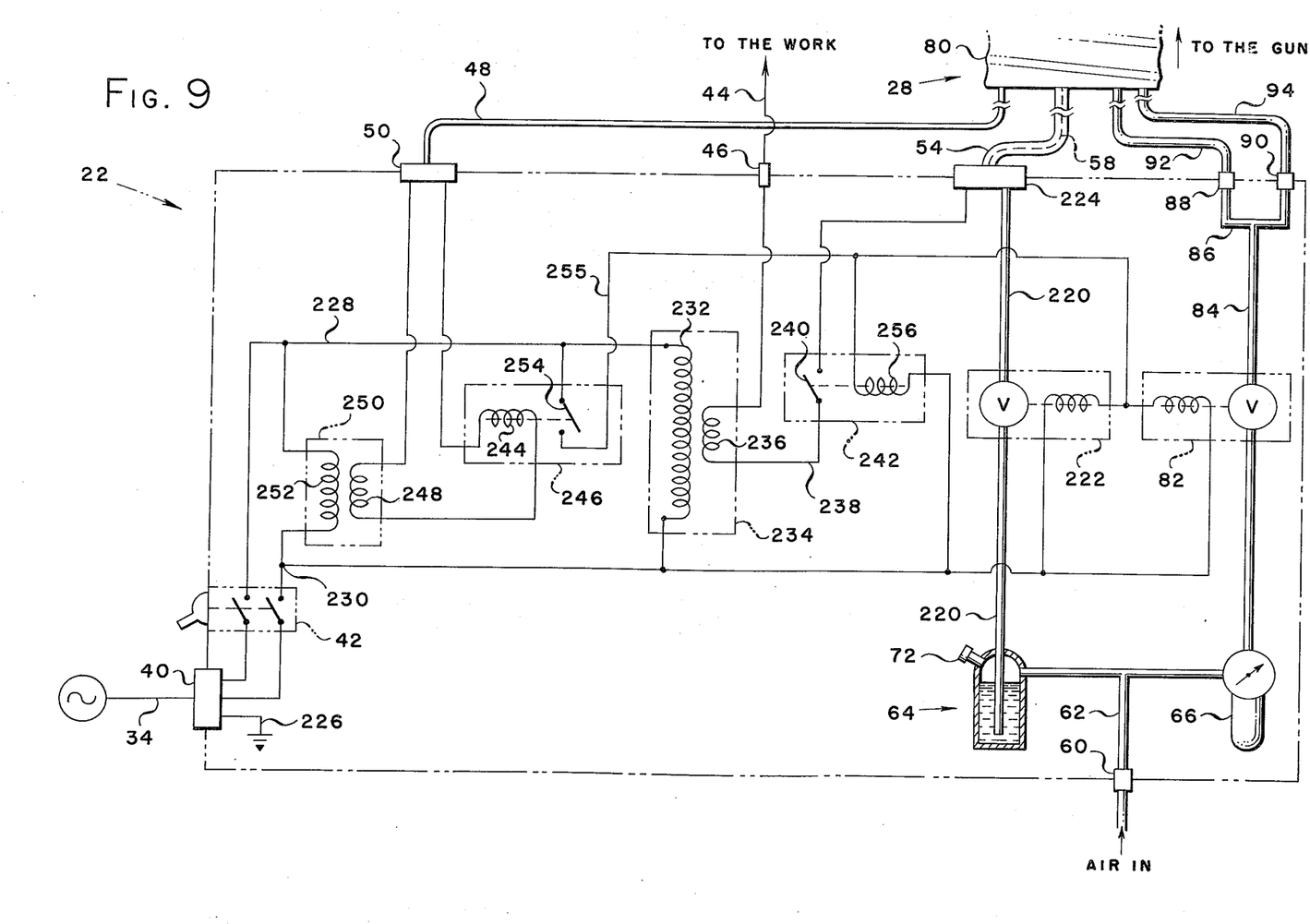
FIG. 9 is a schematic diagram of the electrical, air and water circuits in the console.

The vibrator 100, see FIG. 9, comprises a hollow cylindrical main body 174 whose front end is sealingly threadedly received on a stud portion 176 on the rear end of mixing manifold 104. The rear end of the body 174 is sealed by a cap 178. A free reciprocating hammer member 180 is mounted within the body 174. A light spring 182 is fitted between hammer 180 and cap 178 to bias the hammer forwardly so that it will begin vibrating when air line 92 is pressurized. Hammer 180 is formed with a pair of spaced circumferential, relatively shallow, closed grooves 184 and 186. The body is formed with front and rear exhaust ports 188 and 190 and with a supply port 192 in spaced relation therebetween. The hammer 180 is formed with an air passage 194 which extends from front groove 184 rearwardly to the rear end face of the hammer 180, and with a similar air passage 196 which extends from the rear groove 186 frontwardly to the front face of the hammer. The two passageways 194 and 196 are separate and do not communicate with each other. The front and rear ends of the hammer 180 are of a reduced diameter with respect to the remainder of the body to enhance the hammering effect on portion 176 and cap 178. The cap 178 is formed with a groove 198 which locates the spring 182 and receives most of it when the hammer is in its rearward position. The hammer 180 is symmetrical about many lines and planes to thereby facilitate manufacture and assembly.

The diameters of the three ports 188, 192 and 190 and the widths of the grooves 184 and 186, and these dimensions with respect to the locations of these five features with respect to each other are all such that the hammer 180 will be caused to reciprocate inside the body 174 at a relatively high speed, on the order of between 100 and 400 cycles per second when exposed to air pressures on the order of about 40 to about 90 psi. More pressure produces a higher speed. In designing such a vibrator general engineering principles as to porting and fluid mechanics are applicable, all as will be clear to one skilled in those arts. In general, the vibrator operates by first pressurizing groove 186 and passage 196 (this being the starting position due to spring 182) which causes the hammer to move to the right to strike cap 178. When the hammer is to the right, the first capture burst of air in openings 186 and 196 is relieved by exhaust port 188, and simultaneously groove 184 and passage 194 become pressurized thereby urging the hammer to the left to strike stud portion 176 and returning the parts to the FIG. 7 position to commence another cycle. The vibrator produces a relatively small motion of the quill, on the order of about 0.001 to about 0.005 inch.

It is desired that the air pressure be kept relatively high and the mass of the hammer is kept small so that the hammer will vibrate rapidly to produce many make and break contacts by the electrode and the work to produce a rapid arcing and concurrent erosion rates.

The operation of the vibrating means, sequentially, is air under pressure enters groove 186 thence through passageway 196 resulting in pressurization of the left annular space at the end of the hammer. This produces a force which rapidly accelerates the hammer to the right. This pressure force continues until shut off due to rightward motion of groove 186 out of reach of air entering from 192. At this time the remaining pressurized air in the left annular space is exhausted at 188 as the hammer continues to travel to the right due to momentum. Concurrently, at the right end, the air surrounding the right annular space is expelled through 190 as the hammer moves to the right. This continues until the right shoulder of the hammer closes off 190 and simultaneously the groove 184 is at the edge of the pressurized opening 192. Due to the inertia gained by the hammer from the first impulse, it continues to the right a small distance while it is compressing the air entrapped in the right annular space and concurrently the pressurized air is entering 184 and 194 and building up a resisting pressure on the hammer, but not sufficient to prevent impact with the end cap 178. At this point there is an elastic rebound of the hammer, and due to the increased air pressure the same conditions as explained above proceed in the reverse direction; and then back to the starting condition.

It is thought that operation of the invention would be further enhanced by the addition of means to rotate the electrode about its own axis during operation. This additional motion should further decrease the tendency of the electrode to stick in the work, and should also improve the trueness and straightness of the hole produced. It is thought that the addition of such means would require substantial re-working of the device as disclosed, but would be within the skill of an ordinary tool designer.

Referring back to FIGS. 2 and 4, the front end portion 102 comprises a gun mounting member 200 having a top end formed with a threaded opening 202 which engages a mating stud 204 formed on the front end of the housing 120. An insulator 206, formed of nylon or reinforced fiberglas, or the like electrical insulating material, is joined to mounting member 200 by a plurality of screws 208. The member 200 is bifurcated and the insulator 206 is cut down to fit between the legs thereof, the screws passing through suitable clearance holes in the insulator and mating with suitable threaded openings in the opposite leg (both not shown). A work contacting support rest 210 is joined to the other end of the insulator 206 by a pair of screws 208 in cooperation with structure similar to that described above in regard to member 200, see FIG. 2. The rest 210 is of two-part construction and comprises a rear U-shaped part 212 which is joined to a front face member 214 by a pair of screws 216. The face member 214 is of generally triangular configuration and is formed with a depression in its top edge to clear the electrode 138, and is also formed with a number of convenience holes 218. These holes 218 serve to permit attachment of the entire tool to the work in the event it is desired not to work simply off hand. As is evident, the entire front end assembly 102 can be removed by simply unscrewing the spindle 132 and disconnecting the threaded connection between opening 202 and stud 204. The primary function of front end assembly 102 is to provide a sturdy and reliable rest for the operator in using the gun, while at the same time, via insulator 206, assuring that no short-circuit between gun and work is made through the rest and that the only electrical circuit between gun and work is made via electrode 138. Of course, a front end having other configurations could be used.

Referring now to FIG. 9, the contents of the console 22 and the various circuits of the invention are shown schematically. Many parts shown in FIG. 9 have been described above. Basically, the invention has an electrical circuit and a pneumatic circuit controlled thereby, and the pneumatic circuit aids in operating the electrically controlled water supply.

Beginning with the simpler circuits, bottle 64 is first filled with water via filler 72, and this water is delivered to the gun via a pipe 220 the flow through which is controlled, in an on or off manner, by a solenoid valve 222 virtually identical in structure to the air solenoid valve 82. After solenoid valve 222 line 220 passes to a multiple connector member 224 which is the beginning of conduit 54 containing the water sheathed cable 58. Connectors similar to 224 are known in the welding art.

We have found that the most effective coolant is a combination of air and water in such proportions that all the water will vaporize and not leave any liquid on the workpiece or in the work area. We have also found that for shallow holes; i.e., where the electrode does not go very deeply into the work, air alone is a sufficient coolant. We have also found that, using a liquid reservoir of approximately 32 oz. capacity, about one ounce of a water emulsifiable oil, such as "UNICUT No. 10" by Union Oil Corporation, added to the water improves operation of the invention. It is thought that the oil serves as a lubricant.

The air supply means, including parts 62, 66, 82, 84, 88 and 90 have already been described, and basically the service air is first tapped to drive the water, then throttled, then turned on or off, and then supplied to the lines 92 and 94 to the gun. The air pressure is regulated to provide control over the vibratory force and its frequency, and to keep the water pressure from the bottle higher than the mixing air pressure to guarantee water flow into the air-water mixing chamber.

The main electricity supply at 34 enters the console 22 via polarized receptacle 40 which includes a case ground line 226, and a pair of main circuit lines 228 and 230 which are individually controlled within master two pole switch 42 and thence feed the rest of the circuit as shown. Switch 42 also includes a thermal overload circuit breaker, not shown. The primary coil 232 of a main power transformer 234 is connected to power lines 228 and 230 as shown. The secondary coil 236 of transformer 234 has one side connected to cable 44 via stud 46, and the other side of said coil 236 is connected to a line 238. Flow of electricity in line 238 is controlled by the normally open contacts 240 of a main power relay 242. Main power cable 58 is connected to the other side of said contacts 240. Line 44 to the work completes the main power circuit.

Means are provided to permit switch 52 to operate contacts 240, and to this end, the lines in gun trigger cable 48 after connector 50 include a series circuit of the coil 244 on a relay 246 and the secondary coil 248 on a transformer 250. The primary coil 252 of transformer 250 is connected across main power lines 228 and 230. The normally open contacts 254 on the relay 246 controls the flow of current to the coil 256 on the main power relay 242 and to the coils of the air solenoid 82 and the water solenoid 222, via a line 255, as shown.

The operation of the circuits should now be clear. Coils 232 and 236 in the large transformer 234 are such that low voltage, high amperage power will be delivered to the gun on main power lines 44 and 58; power on the order of 12 volts and 75 amps was utilized in the successfully constructed embodiment. Relay 242 is of the mercury wetted contacts type in order to accommodate the high amperage.

In operation, after main switch 42 is on, the operator's closing of switch 52 will activate coil 244 and close the normally open contacts 254 thereof. The transformer 250 is used to reduce the voltage (to reduce the arc gap) and increase the current (to increase the heating) from that of normally available 110 V single phase supply current, and to isolate the working portions of the gun from the input current supply. Once contacts 254 close, coil 256 closes normally open contacts 240 to supply the main power to the gun electrode, and simultaneously opens the normally closed solenoid valves 82 and 222 to thereby pressurize air lines 92 and 94 and to supply water inside conduit 54.

The invention has been embodied and successfully used in a prototype machine as opposed to being put into regular production as a commercial tool. This prototype is a successful, hand held, compact, and portable tool, and it is anticipated that these advantages can be further enhanced in a "polished" commercial embodiment.

While the invention has been described in detail above, it is to be understood that this detailed description is by way of example only, and the protection granted is to be limited only within the spirit of the invention and the scope of the following claims.

We claim:

1. In a portable electrical discharge metalworking tool, the combination comprising a hollow electrode, a quill portion retaining said electrode for cooperative movement, means to supply electrical energy to said electrode through said quill, means to flow a coolant through said quill and said electrode to the work, means mounted in tandem with said quill and said electrode to vibrate said electrode with respect to the work, and means to automatically move said electrode toward the work.

2. In a portable electrical discharge metalworking tool, the combination comprising a hollow electrode, a quill portion retaining said electrode for cooperative movement, means to supply electrical energy to said electrode through said quill, means to flow a coolant through said quill and said electrode to the work, means mounted in tandem with said quill and said electrode to vibrate said electrode with respect to the work, and means to automatically move said electrode toward the work, said tool including an electrode gun comprising a tandem arrangement of a center and quill portion which includes said electrode and said automatic electrode moving means, a mixing manifold portion including said coolant flow means, and said vibrating means.

3. The combination of claim 2, and a shield on said gun overlying said tandem arrangement with said electrode extending out from under said shield.

4. The combination of claim 2, and an insulating front end rest portion on said gun in said tandem arrangement to the side of said quill portion opposite the side at which said mixing manifold portion is located, said rest portion comprising a mounting member removably mounted on said quill portion, a rest member, an intermediate member formed of an electrical insulating material interconnecting said mounting member and said rest member, said rest member including a face member disposed in a plane generally perpendicular to the axis of said electrode, and said face member being of generally triangular configuration and being formed with a clearance space for the passage of said electrode therethrough.

5. The combination of claim 2, said center and quill portion comprising an elongated quill member formed with a through central opening to receive said electrode therein, said mixing manifold portion being in communication with said quill opening to deliver said coolant thereto, and a collet and securing spindle assembly operatively cooperable with said quill member at the opposite end thereof for securing said electrode with respect to said quill at any selected relative extended position of said electrode in said central quill opening.

6. In a portable electrical discharge metalworking tool the combination comprising a hollow electrode, a quill portion retaining said electrode for cooperative movement, means to supply electrical energy to said electrode through said quill, means to flow a coolant through said quill and said electrode to the work, means mounted in tandem with said quill and said electrode to vibrate said electrode with respect to the work, and means to automatically move said electrode toward the work, said tool comprising an electrode gun which includes said vibrating means in tandem arrangement with said hollow electrode and said means to move the same, said vibrating means comprising a hollow body member and a hammer member within said hollow body member free to reciprocate and to rotate in said body member, means to supply air under pressure at an inlet port in said hollow body member intermediate the ends of said body member and to the hammer member therein, a pair of exhaust ports formed in said body member one to each side of said inlet port and in spaced relation to said inlet port, said hammer member being formed with a pair of circumferential grooves in spaced relation to each other along the axial length of said hammer member and with a pair of separate internal passageways extending one from each of said grooves to the further end of said hammer member with respect to said each of said grooves.

7. The combination of claim 6, and a spring in said hollow body member to urge said hammer to a starting position within said body member with one of said grooves in communication with said inlet port, said last mentioned one of said grooves being the groove closest to said spring, whereby the initial motion of said hammer in said body member will compress said spring.

8. In a portable electrical discharge metalworking tool, the combination comprising a hollow electrode, a quill portion retaining said electrode for cooperative movement, means to supply electrical energy to said electrode through said quill, means to flow a coolant through said quill and said electrode to the work, means mounted in tandem with said quill and said electrode to vibrate said electrode with respect to the work, and means to automatically move said electrode toward the work, said tool comprising a gun, a portable console, and a composite cable interconnecting said gun and said console; said gun including said electrode, said automatic electrode moving means, said coolant flow means, and said vibrating means; means to connect said console to an external supply of electrical energy, means to connect said console to an external supply of pressurized air, transformer means in said console having a primary coil connected to said external electrical supply and a secondary coil to produce said electrical energy supplied to said electrode, a main power cable extending from said transformer secondary coil to connector means on said console, a ground cable extending from the work to said transformer secondary coil, a liquid reservoir in said console, conduit means extending from said liquid reservoir to said connector means, means to drive the liquid in said reservoir through said conduit means from said reservoir to said connector means, said composite cable including a liquid conduit extending from said console connector means to said gun, said main power cable being sheathed in said liquid in said liquid conduit in its passage through said composite cable from said console connector means to said gun, and means to control the flow of said air through said console and said composite cable to said gun.

9. The combination of claim 8, said liquid driving means comprising a conduit branching from said external supply of pressurized air to said liquid reservoir to pressurize the space in said reservoir above the liquid therein, and a solenoid controlled valve in said conduit between said reservoir and said connector means.

10. The combination of claim 8, and manual valve means in said liquid conduit in closely spaced relation to said gun for controlling the flow of liquid from said reservoir to said gun, and said gun comprising means to separate said main power cable and the liquid in said liquid conduit and means to deliver said liquid to said coolant flow means and means to deliver the electrical energy on said main power cable to said electrode.

11. The combination of claim 10, means to divide the controlled flow of pressurized air out of said console into two separate lines, said lines extending from said console through said composite cable to said gun, one of said lines extending to said vibrating means in said gun to drive said vibrating means, and the other of said lines extending to said coolant flow means in said gun, whereby said coolant flow means mixes said air and said liquid to produce said coolant for delivery through said electrode to the work.

12. The combination of claim 11, said tool comprising an electrode gun which includes said vibrating means in tandem arrangement with said hollow electrode and said means to move the same, said vibrating means comprising a hollow body member and a hammer member within said hollow body member means to supply air under pressure at an inlet port in said hollow body member intermediate the ends of said body member and to the hammer member therein, a pair of exhaust ports formed in said body member one to each side of said inlet port and in spaced relation to said inlet port, said hammer member being formed with a pair of circumferential grooves in spaced relation to each other along the axial length of said hammer member and with a pair of separate internal passageways extending one from each of said grooves to the further end of said hammer member with respect to said each of said grooves, and internal passageways in said gun handle to deliver the air from said two separate lines to said vibrating means and said coolant flow means respectively.

13. The combination of claim 11, said pressurized air control means comprising a pressure regulator and a solenoid controlled air valve.

14. The combination of claim 8, said gun comprising a tandem arrangement of a center and quill portion which includes said electrode and said electrode moving means, a mixing manifold portion including said coolant flow means, and said vibrating means; and a handle connected to said center and quill portion.

15. The combination of claim 14, and an insulating front end rest portion on said gun in said tandem arrangement to the side of said quill portion opposite the side at which said mixing manifold portion is located, said rest portion comprising a mounting member removably mounted on said quill portion, a rest member, an intermediate member formed of an electrical insulating material interconnecting said mounting member and said rest member, said rest member including a face member disposed in a plane generally perpendicular to the axis of said electrode, and said face member being of generally triangular configuration and being formed with a clearance space for the passage of said electrode therethrough.

16. The combination of claim 14, said center and quill portion comprising an elongated quill member formed with a through central opening to receive said electrode therein, said mixing manifold portion being in communication with said quill opening to deliver said coolant thereto, and a collet and securing spindle assembly operatively cooperable with said quill member at the opposite end thereof for securing said electrode with respect to said quill at any selected relative extended position of said electrode in said central quill opening.

17. The combination of claim 8, said composite cable including a trigger cable extending from an on/off switch in said gun to a relay in said console; said relay comprising a pair of normally open contacts disposed in a circuit containing a parallel arrangement of the coil of a second relay, the coil of a solenoid valve for controlling the flow of said liquid from said reservoir to said connector means, and the coil of a solenoid valve to control the flow of said pressurized air out of said console; and said second relay containing a pair of normally open contacts disposed in said main power cable.

18. The combination of claim 17, wherein said contacts of said second relay are mercury wetted contacts.

19. In an electrical discharge metalworking machine, the combination comprising,
an electrode gun comprising;
a tandem arrangement of a quill, including
a hollow electrode, and
means for automatically moving said electrode towards the work comprising,
a cross shaft mounted in said center quill portion of said gun perpendicular to the axis of said electrode,
a pair of flat coil springs mounted in side-by-side relation on a free end of said cross shaft and wound in opposite directions, and
a housing mounted for rotation on said free end of said cross shaft and overlying said springs,
each of said springs having one end secured to said cross shaft and its other end secured to said housing,
a mixing manifold portion including means to flow coolant through said electrode to the work, and
means to vibrate said electrode with respect to the work, and
means to supply electrical energy to said electrode.

20. The combination of claim 19, and a handle fixed to said cross shaft on the other free end thereof opposite said free end which mounts said springs.

21. The combination of claim 19, and a close friction fit between said housing and said gun, and flat spring means for urging said housing into said friction fit.

22. In an electrical discharge metalworking machine, the combination comprising:
a gun, including a tandem arrangement of a center quill, further including
a hollow electrode, and
means to automatically move said electrode towards the work comprising a cross shaft mounted in said gun in said center quill portion perpendicular to the axis of said electrode, a pair of flat coil springs mounted in side-by-side relation on a free end of said cross shaft and wound in opposite directions, and a housing mounted for rotation on said free end of said cross shaft and overlying said springs, each of said springs having one end secured to said cross shaft and its other end secured to said housing, a mixing manifold portion including means to flow a coolant through said electrode to the work, means to vibrate said electrode with respect to the work, and a handle connected to said center quill portion;

means to supply electrical energy to said electrode;

a portable console;

a composite cable interconnecting said gun and said console and including a liquid conduit extending from said console connector means to said gun;

means to connect said console to an external supply of electrical energy;

means to connect said console to an external supply of pressurized air;

means to control the flow of said air through said console and said composite cable to said gun;

transformer means in said console having a primary coil connected to said external electricity supply and a secondary coil to produce said electrical energy supplied to said electrode;

a ground cable extending from the work to said transformer secondary coil;

a liquid reservoir in said console;

liquid conduit means extending from said liquid reservoir to said connector means;

a main power cable extending from said transformer secondary coil to connector means on said console and being sheathed in liquid in said liquid conduit in its passage through said composite cable from said console connector means to said gun; and means to drive the liquid in said reservoir through said conduit means from said reservoir to said connector means.

* * * * *